Aug. 16, 1966            K. W. McLOAD           3,267,369
METHOD AND APPARATUS FOR TESTING CABLE CORES
INCLUDING MEANS FOR CAUSING THE CABLE TO
TWIST ABOUT ITS LONGITUDINAL AXIS

Filed April 15, 1963           3 Sheets-Sheet 1

Kenneth W. McLoad
INVENTOR.

BY *Bertram H. Mann*
ATTORNEY

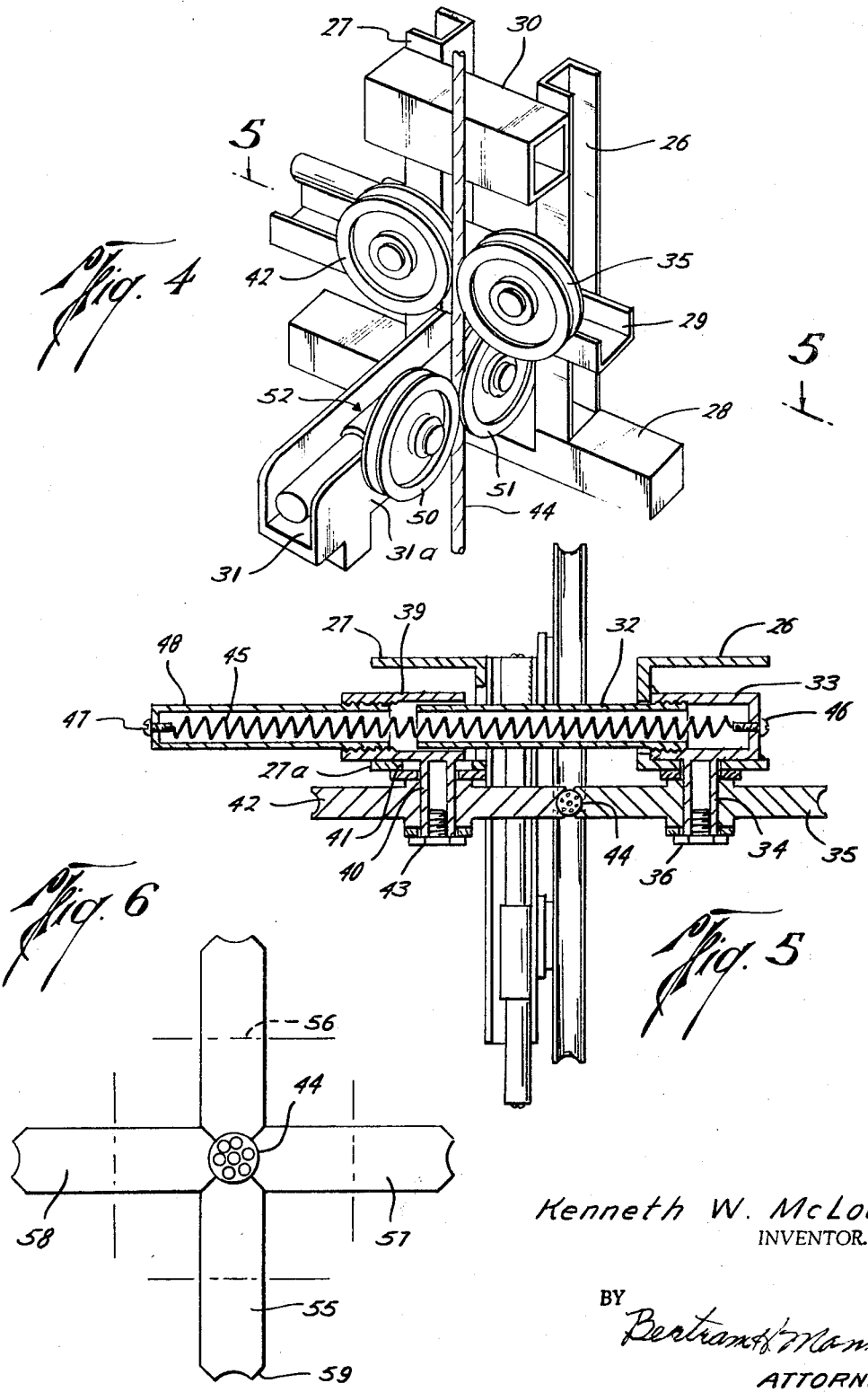

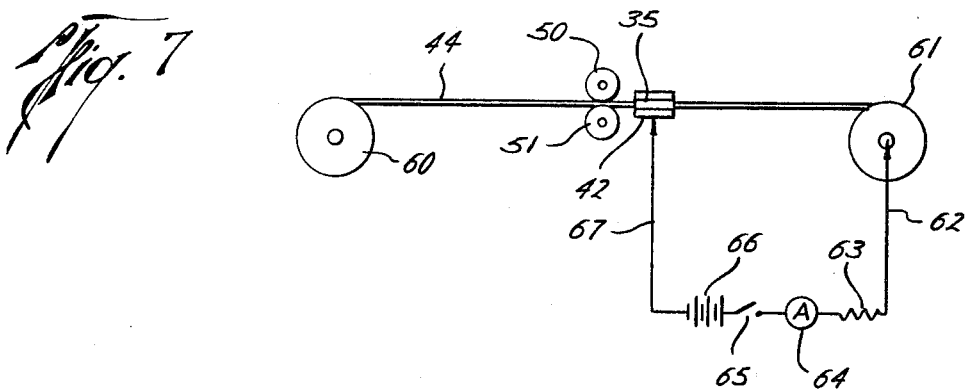
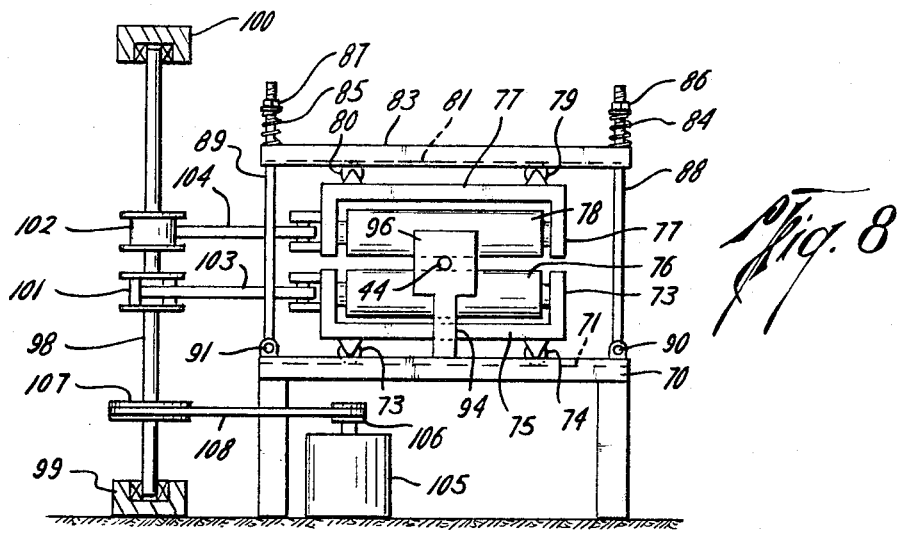
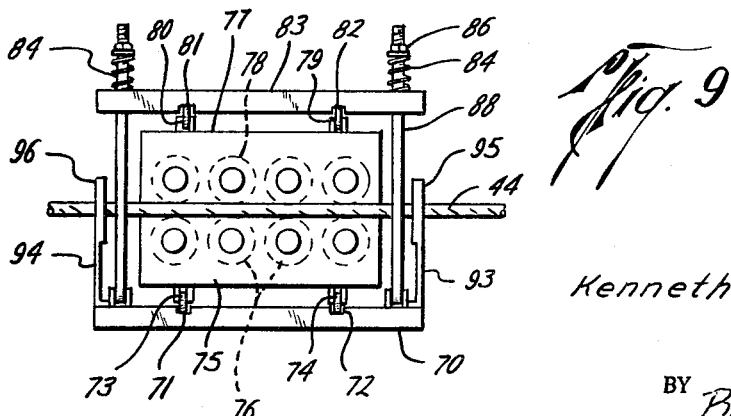
Kenneth W. McLoad
INVENTOR.

United States Patent Office 3,267,369
Patented August 16, 1966

3,267,369
METHOD AND APPARATUS FOR TESTING CABLE CORES INCLUDING MEANS FOR CAUSING THE CABLE TO TWIST ABOUT ITS LONGITUDINAL AXIS
Kenneth W. McLoad, Houston, Tex., assignor to Vector Cable Company, Houston, Tex., a corporation of Texas
Filed Apr. 15, 1963, Ser. No. 272,911
5 Claims. (Cl. 324—54)

This invention relates to methods and apparatus for testing the core assemblies for armored electrical conductor cables before the application thereto of the armor wires.

In particular, the invention is beneficial when utilized in the manufacture of cables of the type having a core assembly comprised of multiple, individually insulated electrical conductors embedded in and supported by a core matrix which may be, for example, a semi-conducting material to minimize cross talk effects, the core assembly being encased in spiralled, load-supporting armor wires. An exemplary cable of this type consists of a central conductor embedded in a sub-matrix of semi-conductive material, such as an acrylonitrile-butadiene or neoprene type elastomer which cures to a tough, flexible and monolithic form. Other conductors are spirally wound about the sub-matrix in proper spaced relationship to form a sub-core assembly and, thereafter, an outer layer of matrix material is applied by extrusion to the sub-core assembly. Upon curing, the matrix material is integrated with the sub-matrix so that all of the insulated conductors are embedded in and supported by the solid matrix to form the core assembly. This assembly is then armored by the helical application thereto of inner and outer armor wires in the usual manner to form the finished armored electrical cable.

In the manufacture of this cable, it has been found that the insulation for the individual conductors, which may be, for example, Teflon or other suitable insulating material, may contain contaminating inclusions such as metal flakes or other foreign materials. Since the core assembly in the finished cable is subjected to substantial radial compression by the armor wires and such compression is greatly increased upon application of tensile forces to the cable, as in suspending instruments in an oil well bore, metal flakes or other foreign inclusions in the insulation material can cut through the insulation wall thereby causing a conductor to have an electrical leak. It will be appreciated that this problem becomes more aggravated as the wall thickness of the insulating material decreases. Heretofore, such electrical leaks have been discovered only after the cables were completed and tested and sometimes only after field use. The location of such electrical leaks in the finished cable and the repair of the leaks is difficult and expensive.

The main object of the present invention is to provide novel apparatus and methods for discovering and indicating electrical leaks in the core for a conductor cable, before application of the armor wires.

Another object is to provide means for subjecting the core for a conductor cable to radial stresses and concurrently therewith, or thereafter, exposing the core to a high enough electrical potential between the conductor and the surface of the insulating and separating material to provide an indication as to imperfections in the material.

According to the present invention, the core assembly, prior to the armoring thereof, is subjected to radial compressive forces simulating those applied in the armoring and use of the cable. Concurrently therewith, or in any case, before the application of the armor wires, a difference of electrical potential is impressed upon the conductors and the outer surface of the embedding matrix. An ammeter in the circuit is observed for changes in current flow which would indicate insulation failures. The location of such failures is then noted for repair, which can be relatively easily achieved before the armoring step.

In the accompanying drawings which illustrate the invention,

FIG. 4 is a perspective view of one form of apparatus for applying the novel method.

FIG. 5 is a horizontal section taken substantially on line 5—5 of FIG. 4.

FIG. 6 is a schematic representation of a modified form and arrangement of the grooved, cable-compressing wheels.

FIG. 7 is a representation of the electrical circuit used in the test operation.

FIG. 8 is a side view of another, preferred form of test apparatus for the core assembly.

FIG. 9 is a front view of the apparatus shown in FIG. 8.

Figure 1:
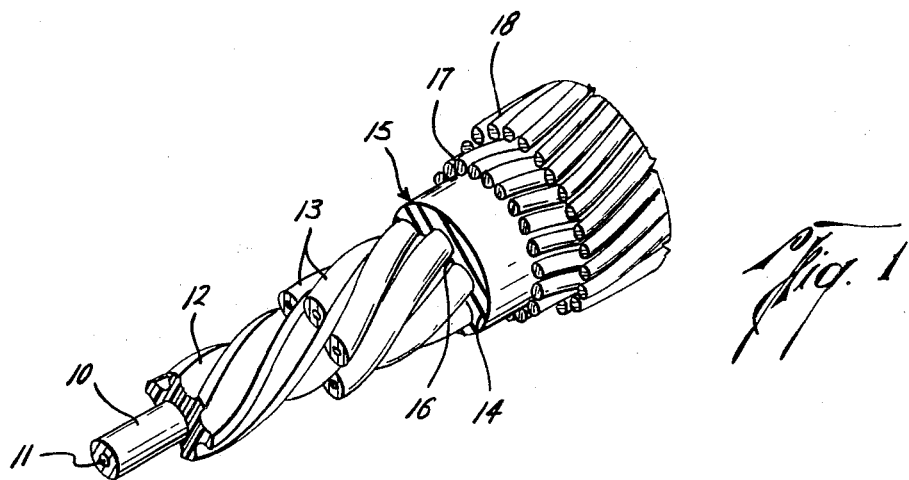
FIG. 1 is a view in perspective of an armored well logging cable, successive components being broken away to better illustrate details of the cable structure.
Figure 2:
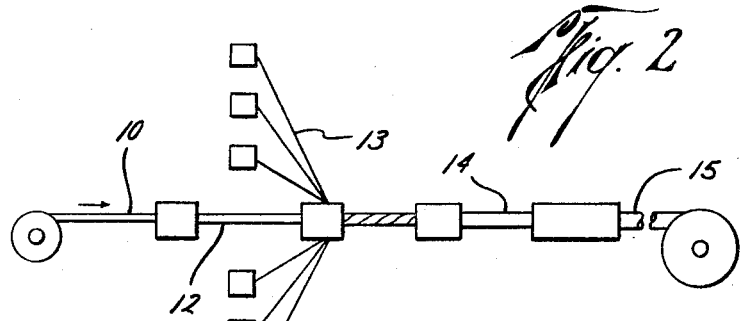
FIG. 2 is a schematic representation of a portion of an apparatus for forming the cable.

The cable illustrated in FIG. 1 is particularly suited to testing by the present method and apparatus, although the invention is not limited thereto. The cable consists of a central axial conductor 10 which includes woven wires 11 encased in a suitable insulation sheathing such as "Teflon." Conductor 10 is centrally embedded in a core matrix member 12 to form a sub-matrix. This may be done as shown in FIG. 2 by extruding the matrix material over the conductor 10. Spirally wound about member 12 are outer insulated conductors 13, each constructed similar to conductor 10. The spiralled conductors 13 are completely encased by additional matrix material 14 extruded over the sub-assembly as shown in FIG. 2. Upon curing, material 14 joins with the matrix material 12 to provide a core assembly which is a monolithic sheathing 15 having a generally cylindrical outer surface. Sheating 15, preferably, is formed of an extrudable, semi-conductive, oil and gas resistant elastomer which cures to a tough, flexible and monolithic form and maintains its physical properties at bore hole temperatures and pressures. For instance, the acrylonitrile-butadiene rubber known commercially as "Hycar" is well adapted for this purpose. It will be noted that the sheathing 15, as unified in the finished core, has hour glass portions 16 extending about the conductors 13 so that the spiral conductors are firmly and uniformly supported and separated from each other and from the central conductor 10 by the matrix material.

Figure 3:
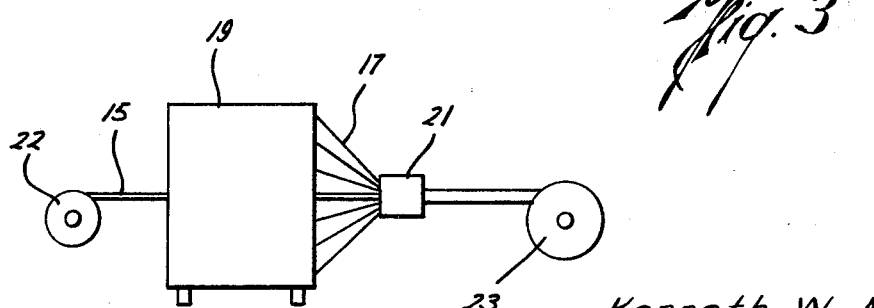
FIG. 3 is a schematic representation of the armoring step in forming the cable.

Received about the sheating 15 are oppositely-spiralled armor wires 17 and 18. FIG. 3 illustrates, schematically, the armoring apparatus of the type including rotatably mounted framing 19 carrying multiple spools from which are unwound armor wires 17 and 18 which are fed, in turn, through a pre-forming head 21 for laying about the outer surface of the sheating 15 of the core assembly. The core assembly is fed axially through the rotatable armoring frame 19 from a supply spool 22 and the finished cable is wound upon a take-up spool or reel 23. The armor wires carry tensile stresses applied to the cable and protect the core and, also, result in the application of substantial compression to the core assembly which may cause the leakage problems as previously noted. It will be appreciated that the armoring apparatus, which is only schematically shown, applies the armor wires in opposite directions, forming inner and outer layers of armor wire, as in FIG. 1.

FIGS. 4 and 5 illustrate one form of apparatus useful in the practicing of the present invention. The apparatus includes a pair of upright channels 26 and 27 mounted upon a base 28. Uprights 26 and 27 are braced intermediately by a horizontal channel bar 29 and at the top by a cross bar 30. An additional channel bar 31 is rigidly secured to the lower portion of upright 27 and extends at 90° thereto.

A tube 32 extends between and through the adjacent inner webs of uprights 26 and 27. At its right end (FIG. 5), the tube 32 is threadedly attached to a cup shaped cap member 33 which is suitably secured to the forward flange 26a of upright 26. A journal boss 34 projects from cap member 33 through an opening in flange 26a. A peripherally grooved wheel 35 is rotatable on boss 34 and is secured in position by means of a machine screw 36 threaded into the outer end of the boss.

The opposite end of tube 32 is slidably received within a sleeve 39 from which projects a journal boss 40 extending through and slidable in a horizontally elongated slot 41 in upright flange 27a. A peripherally grooved wheel 42 is rotatably mounted on boss 40 and secured in position by means of a machine screw 43 threaded into the outer end of the boss. Grooved wheels 35 and 42 are diametrically aligned and normally engage or closely approach each other at their adjacent peripheral portions to form an aperture of somewhat less diameter than that of the core assembly 44 so as to apply radial compressive forces thereto, as will be explained. The grooved wheels are resiliently urged together by means of a tension spring 45 secured at one end to a rivet or screw 46 mounted in the end of cap member 33 and, at its other end, to a rivet or screw 47 secured in the end of an adjusting tube 48 which is threadedly received in sleeve 39 and may normally abut the adjacent end of tube 32 to limit the contraction of the telescoped system including members 33, 32 and 48 and the approach of grooved wheels 35 and 42. The stress applied by spring 45 tending to resist diametrical separation of the grooved wheels may be adjusted by screwing adjusting tube 48 either further into or out of sleeve 39. Such adjustment will equip the apparatus for adjusting the pressure applied to the cable cores. A separate stop may be provided in sleeve 39 for limiting the entry of tube 32 thereinto.

A second pair of grooved wheels 50 and 51 are resiliently mounted upon the inner flange 31a of transverse channel bar 31 by means of a spring-biased telescoping structure, generally designated 52 and similar to the spring biased structure 33, 32 and 48 previously described. Grooved wheels 50 and 51 are disposed at 90° to wheels 35 and 42 and their adjacent peripheries form an aperture aligned with the aperture between upper grooved wheels 35 and 42 for similarly compressively receiving the core assembly 44. Thus, the four wheels cooperate to substantially completely surround the cable core being tested.

FIG. 6 illustrates schematically a modified formation and arrangement of grooved wheel pairs 55 and 56 and 57 and 58. The pairs are all mounted with their axes in a common plane and with the pairs at 90° to each other, as previously. The peripheries of the grooved wheels are chamfered, as at 59, so that the wheels may fit together for substantially completely encircling the core assembly 44. Suitable means, for instance as illustrated in FIG. 5, will be provided for biasing the grooved wheels of each pair toward the center so as to apply the proper radial compressive forces to the core assembly being tested.

FIG. 7 illustrates means for electrically testing a core assembly being handled by the described apparatus. Prior to armoring, the core assembly 44, including sheathing 15, is supplied from a pay-out spool 60 between the pairs of wheels 50, 51 and 35, 42 of the test apparatus. Adjusting tubes, as 48, of the grooved wheel biasing structures are manipulated so that the core assembly is subjected to radial compressive forces at least as great as the compressive forces applied in the armoring operation and in use, but not great enough to deteriorate the core assembly, for instance, cause separation of the matrix material from the conductors. It has been found that in an exemplary application to a cable of the type described above, the opening between the grooved wheels should cause a compression of about 4% of the diameter of the cable assembly being drawn therebetween.

The conductors of the core assembly being tested are electrically connected to the take-up spool 61 and are connected through the take-up spool to an electrical circuit including a wire 62, resistance 63, ammeter 64, power switch 65, and a battery 66. The opposite side of the battery and the test apparatus are both grounded, as symbolized by wire 67, with the result that the difference of potential generated in the circuit is impressed across the conductors and the embedding insulation and sheathing 15. I have found that a difference of potential of about 2,000 volts so applied will cause a notable change in the reading of ammeter 64 when a defective part of the core assembly has passed between the grooved wheels. The defective part of the core assembly is noted either visually or by some other means for later repair prior to armoring.

FIGS. 8 and 9 show a preferred embodiment of the test apparatus including a base plate 70 carrying spaced roller guides 71 and 72 upon which travel the rollers 73 and 74 depending from a U-shaped lower frame 75. A series of closely spaced, cylindrical rollers 76 are rotatably mounted in frame 75 in parallel relationship. An upper, U-shaped frame 77 rotatably supports a similarly arranged series of cylindrical rollers 78. Frame 77 mounts upwardly disposed roller bearings 79 and 80 which travel on guide ways 81 and 82 on a top plate 83. The top plate and base member 83 and 70 are resiliently biased toward each other by compression springs 84 and 85 compressed between top plate 83 and adjusting nuts 86 and 87 threaded on rods 88 and 89 pivotally secured at 90 and 91 to the base plate. U-shaped frames 75 and 77 and rollers 76 and 78 carried thereby also are urged together so as to apply radial compressive forces to a core assembly 44 inserted therebetween.

Upstanding arms 93 and 94 provided at opposite edges of base plate 70 carry core guides 95 and 96 with central apertures on a line extending between the series of rollers 76 and 78 for guiding a core assembly 97 between the rollers. A crank shaft 98 is journaled at its ends in fixed bearings 99 and 100 and extends vertically along the left side of the apparatus (FIG. 8). Shaft 98 carries a pair of cranks 101 and 102 operatively connected by means of connecting rods 103 and 104, respectively, to the lower and upper U-shaped frames 75 and 77. The crank shaft is powered by means of a motor 105 acting through drive sheaves 106 and 107 and a drive belt 108. Cranks 101 and 102 are arranged so that the U-shaped frames reciprocate oppositely.

In operation of this form of the apparatus, the core assembly, prior to armoring, is fed transversely of and between rollers 76 and 78 from a pay-out spool to a draw-off spool, as at 60 and 61 in FIG. 7. At the same time as the core assembly is being drawn between the rollers, the rollers are being oppositely reciprocated end-wise by means of powered cranks 101 and 102. This has the effect of twisting the core back and forth and causing the rollers to ride helically along the surface thereof. The rate of linear movement of the core assembly between the rollers is adjusted, with relation to the number, size and spacing of the rollers so that the entire surface of the core assembly is contacted by the rollers and all parts of the assembly, thereby, subjected to radial compressive forces. The lengths of the rollers are adjusted so as to avoid permanent torsional distortion of the core assembly. In an exemplary embodiment, the engaging surfaces of the rollers in length are about twice the circumference of the core assembly.

As in the previous form, the core conductors will be subjected to the positive side of a current supply while the rollers will be at ground potential. The preferred form of the present invention has the advantage of applying compressive forces which closely simulate those applied by the armor wires.

While the core assembly test apparatus and methods herein described are well adapted for application to the type of conductor cable also described, other types of cables may be so tested for discovering defects which, otherwise, may occur as the result of armoring or other compressive influences to which the cable may be subjected. The discovery of such defects prior to the application of the armor wires is particularly advantageous in the simplicity and reduced cost of necessary repairs.

The invention may be modified in various respects as will occur to those skilled in the art, and the exclusive use of all modifications as come within the scope of the appended claims is contemplated.

I claim:

1. Apparatus for electrically testing cable core assemblies comprising; a pair of juxtaposed, generally parallel cylindrical rollers, means coupled between said rollers for applying radial compressive forces to a core assembly being fed between said rollers, means to shift said rollers axially relative to the core assembly and substantially transversely of the longitudinal axis of said assembly thereby causing said rollers to traverse the surface of a core assembly circumferentially as well as longitudinally, and means connected to the rollers for electrically testing the core assembly.

2. Apparatus as described in claim 1 further including means for causing said rollers to reciprocate axially in opposite directions to apply back and forth rolling action to the core assembly for causing said rollers to bear spirally against the core assembly and thereby twist the core assembly about its axis.

3. Apparatus for testing a cable core assembly of the type having multiple conductors and insulating material encasing the same comprising two sets of parallel, cylindrical rollers, the rollers in each set having a tangential surface in a common plane, means coupled between said roller sets for applying radial compressive forces to a core assembly therebetween, means mounting said sets for movements in the planes of their axes, and means operatively connected to said sets for causing opposite axial reciprocation thereof and thereby causing back and forth rolling of a core assembly being fed therethrough whereby said rollers bear substantially spirally against the core assembly, means for applying an electrical potential to the conductors of the core assembly and said rollers, and means for indicating any change in current flow between said conductors and rollers due to the application of compressive forces to the core assembly.

4. The method of testing an electrical cable which consists in applying compressive forces to the opposite surfaces of the cable while moving the cable longitudinally between two points, at the same time twisting the cable about its longitudinal axis to permit the compressive forces to be applied to substantially the entire external surface of the cable, subjecting the cable to electrical energy, and sensing any change in a parameter of the electrical energy due to and during the application of the compressive forces to the cable.

5. The method of testing a cable core assembly of the type having multiple conductors separated and covered by insulating material which consists in applying opposing radial compressive forces to substantially the entire external surface of the assembly; twisting the cable core assembly about its longitudinal axis; subjecting the conductors and the insulating material to an electrical potential; and, during the application of compressive forces to the assembly, sensing any change in current flow across the conductors and insulating material due to the application of compressive forces to the assembly.

References Cited by the Examiner

UNITED STATES PATENTS

| | | | |
|---|---|---|---|
| 1,555,249 | 9/1925 | Pickard | 324—54 |
| 1,938,684 | 12/1933 | Bond et al. | 324—54 |
| 2,126,932 | 8/1938 | Spyut | 324—54 |
| 2,471,560 | 5/1949 | Everson et al. | 324—54 |
| 2,577,793 | 12/1951 | Miller | 57—35 X |
| 2,900,597 | 8/1959 | Gooding | 324—54 |
| 3,037,162 | 5/1962 | Jones et al. | 324—54 |

FOREIGN PATENTS

| | | |
|---|---|---|
| 760,040 | 10/1953 | Germany. |
| 5,002 | 4/1886 | Great Britain. |

WALTER L. CARLSON, *Primary Examiner.*

FREDERICK M. STRADER, *Examiner.*

G. R. STRECKER, *Assistant Examiner.*